April 26, 1949.  H. KAHN  2,468,298
COMBINATION DENTAL FLOSS HOLDER AND TOOTHBRUSH
Filed Oct. 25, 1946
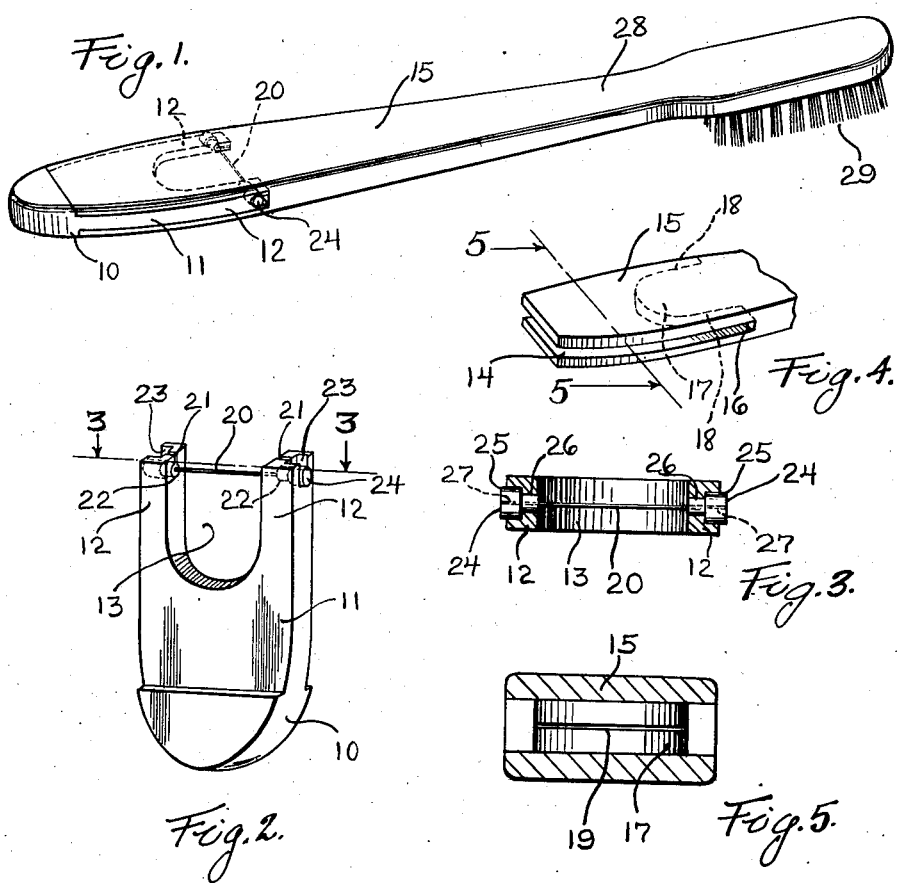
INVENTOR.
Henry Kahn
BY Clarence E. Threly
His Attorney.

Patented Apr. 26, 1949

2,468,298

UNITED STATES PATENT OFFICE 2,468,298

COMBINATION DENTAL FLOSS HOLDER AND TOOTHBRUSH

Henry Kahn, Chicago, Ill.

Application October 25, 1946, Serial No. 705,685

2 Claims. (Cl. 132—84.1)

My invention relates to a combination dental floss holder and tooth brush and has for its principal object the provision of an improved dental floss holder constituting an extension of the handle of the tooth brush and provided with novel means for maintaining in taut condition a length of dental floss.

Among the several objects of the invention is the provision of a dental floss holder as a part of a tooth brush whereby either the brush element or the dental floss holder may be used independently of the other.

Another and equally important object of the invention resides in the novel provision for removably associating the dental floss holder with the handle of a tooth brush.

Yet another object of the invention resides in the novel provision of means for removably associating a length of dental floss with a holder and in the arrangement for confining the dental floss within the handle of a tooth brush when not in use, thereby to guard the dental floss from breakage or contact with foreign matter such as dirt or the like.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of the invention;

Fig. 2 is a perspective view of the dental floss holder embodied in the invention;

Fig. 3 is a sectional detail view taken substantially on line 3—3 of Fig. 2;

Fig. 4 is a fragmentary perspective view of the bifurcated end portion of the tooth brush handle with which the dental floss holder is removably associated;

Fig. 5 is a sectional detail view taken substantially on line 5—5 of Fig. 4.

In the embodiment of my invention selected for the purpose of illustration, I prefer to make a dental floss holder which comprises a body 10 having a reduced portion 11 bifurcated to provide arms 12 spaced from each other to provide an open recess 13. This reduced body portion 11 is adapted to be inserted in the bifurcated end portion 14 of a handle 15. When the reduced portion 11 is inserted in the handle 15, as shown in Fig. 1, the holder provides a continuation of this handle 15. At the base 16 of the bifurcation 14 of the handle 15, is an insert block 17 which is adapted to be inserted in the recess 13 with its side walls 18 frictionally engaging the adjacent sides of the arms 12, whereby to removably secure the holder within the bifurcated end portion 14 of the handle 15.

This insert block 17 is provided with a transversely extending slit 19 into which is adapted to be positioned a length of dental floss 20 when the dental floss holder is mounted in the bifurcation 14.

Means is provided for attaching this length of dental floss to the arms 12 so that the floss may be easily removed when it becomes worn or otherwise unfit for use.

This means comprises forming in the arms 12 slits 21, the bases of which terminate into openings 22, with these openings 22 terminating into enlarged open notches 23. To each end of the length of dental floss 20, I provide plugs 24. These plugs 24 comprise heads 25 adapted to engage in the notches 23, and, inwardly of these heads 25, reduced shank portions 26 insertable in the openings 22.

The ends of the dental floss 20 may be secured in these plugs 24 in any approved meanner, as by threading the floss through openings 27 formed in these plugs.

The overall length of the dental floss holder, as shown in Fig. 2, should be of such dimension as to permit easy insertion in the mouth and yet of a dimension long enough to afford sufficient gripping surface whereby the holder may be firmly held in the hand during movement of the floss between the teeth.

To complete the invention, the end portion 28 of the handle 15 is provided with suitable tooth brush bristles 29.

From the description herein, taken in connection with the accompanying drawings, it will be apparent that I provide a combination dental floss holder and tooth brush which comprises relatively few parts, constructed for simple and expeditious assembly, thereby permitting economical manufacture.

It will be apparent that when the holder is confined in the handle by insertion of the reduced end portion 11 into the bifurcation 14 of the handle, the length of dental floss will be concealed within the slit 19, thereby to protect the same from deposit of foreign matter such as dirt or the like. The degree of friction between the insert block 17 and the adjacent walls of the arms 12 may vary, it being desirable that this friction be of that degree which will removably retain the holder in position with respect to the handle 15.

The holder and the toothbrush handle may be formed of such material as will best serve the purpose and may be of any desired shape or design.

As shown in the drawings, the enlarged portion 25 of the plug 24 extends a slight distance outwardly from the adjacent sides of the arms 12, this to afford gripping of these plugs to facilitate removal or placement of the dental floss in the holder.

It will be apparent that in mounting the length of dental floss in the holder, it will be slightly stretched so as to permit the reduced portions 26 to snap into their respective openings 22, it being understood that the illustrations in the drawings are substantially enlarged. In the plugs 24 there may be provided finger notches to facilitate this stretching operation.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus decsribed my invention, what I claim as new and desire to protect by Letters Patent is:

1. A combination tooth brush and dental floss holder comprising a handle having a bristle-bearing end portion and an opposite bifurcated end portion, said handle providing an insert block at the base of the bifurcation of the handle, a member constituting an extension of said handle and having a reduced portion insertable in the bifurcation of said handle, with the reduced portion having spaced arms providing a recess for the insert block, and supporting means for a length of dental floss.

2. A combination tooth brush and dental floss holder comprising a handle having a bristle-bearing end portion and an opposite bifurcated end portion, said handle providing an insert block at the base of the bifurcation of the handle, a member constituting an extension of said handle and having a reduced portion insertable in the bifurcation of said handle, with the reduced portion having spaced arms providing a recess for the insert block and supporting means for a length of dental floss, said insert block providing a slit for the reception of said dental floss when the insert block is confined in said recess.

HENRY KAHN.

REFERENCES CITED

The following references are of record in the file of this patent:

UNITED STATES PATENTS

| Number | Name | Date |
|---|---|---|
| 695,092 | Cowan | Mar. 11, 1902 |
| 736,650 | Storms | Aug. 18, 1903 |
| 1,695,238 | Kalenoff | Dec. 11, 1928 |